2,840,568

ACID MILLING OF PHTHALOCYANINE PIGMENTS

Robert E. Brouillard, Westfield, and Thomas D. Mutaffis, North Plainfield, N. J., and Marvin O. Shrader, Pittsburgh, Pa.

No Drawing. Application April 29, 1953 Serial No. 352,021

11 Claims. (Cl. 260—314.5)

The present invention relates to a process for conditioning phthalocyanine pigments, and more particularly, to an acid pasting procedure which provides phthalocyanine pigments whose particle size, particle size distribution, and particle surface characteristics render them exceedingly suitable for pigmentation of coating and printing compositions, self-supporting films and other solid objects and the like.

In the copending application Serial No. 230,084, filed June 5, 1951, by R. E. Brouillard, now Patent 2,716,649, there is disclosed and claimed a process for conditioning phthalocyanine pigments comprising milling with shearing forces a mixture comprising a phthalocyanine pigment and a quantity of a strong, normally liquid non-oxidizing acid sufficient to produce with the pigment a doughy kneadable mass, and drowning the resulting magma in water. That process enables the attainment of highly desirable results. It eliminates the disadvantages attributable to the prior methods of acid pasting which require large amounts of acid. The process also greatly shortens the treatment time, produces a presscake with a relatively high solids content, and is applicable to pigments which are unstable to conventional acid pasting.

While the process of said copending application is satisfactory in most instances, the products produced thereby sometimes do not have the transparency properties required for certain purposes. Such transparency properties are important in several end uses in which the phthalocyanine pigments are employed. In the production of multi-color effects in which other colors are used in conjunction with the phthalocyanine pigment in the production of coating and printing compositions, self-supporting films, and other solid objects, it is necessary that the phthalocyanine pigment have transparent properties in order to obtain the desired gross effects. Also, in the production of iridescent effects obtained by mixing phthalocyanine pigments with aluminum flakes in a vehicle, as for example, in the surface coating of automobiles, it is important that the phthalocyanine pigment transmit the light reflected from the aluminum flakes.

It is an object of this invention to provide a process which will have all of the advantages of the process of said copending application and which will produce phthalocyanine pigments having improved transparency properties. Other objects and advantages will appear as the description proceeds.

The above objects are attained by the instant invention which is directed to a process comprising milling with forces predominantly shearing in nature, a mixture comprising a phthalocyanine pigment, an acid-stable, water-soluble inorganic salt and a quantity of a strong normally liquid non-oxidizing acid sufficient to produce with the pigment and salt a doughy kneadable mass, and drowning the resulting milled mixture in water. The aqueous mixture is then filtered and washed acid free.

The procedure of this invention is suitable for the conditioning of any phthalocyanine such as metal free phthalocyanine, metal phthalocyanines, such as copper, nickel, cobalt, zinc and lead phthalocyanines, halogenated metal and metal free phthalocyanines such as copper octachloro phthalocyanine, copper hexadecachloro phthalocyanine, and the like. The phthalocyanine may also be nuclearly substituted with nitro, amino, thio, oxy, carbonyl, alkoxy, aryl, aryloxy and other groups.

The acid-stable, water-soluble salts employed in the process of this invention are in general alkali metal sulfates and phosphates, as for example, sodium and potassium sulfates, acid sulfates, phosphates, acid phosphates, and the like. The amount of salt required for optimum performance should be at least one-half part by weight per part of pigment. Generally, no more than five parts by weight of salt per part of pigment is required since larger amounts require higher acid consumption and thus interfere with the basic economic advantages of the instant process.

Operative strong, non-oxidizing normally liquid acids for the purpose of the instant process are sulfuric, phosphoric, chlorosulfonic, chloroacetic and lower alkylsulfonic acids such as methyl sulfonic, ethyl sulfonic and the like. The greatest economy and best results are obtained with sulfuric acid and the use of this acid is, therefore, preferred.

One of the essential features of this process is the quantity of acid employed. Such quantity should be that necessary to produce with the pigment and salt a doughy kneadable mass. The particular quantity of acid which will give this result can be readily determined by experimentation. Thus, if the quantity is too small, the pigment does not wet out completely. Too great a quantity of acid, on the other hand, does not allow adequate shearing, and leads to lumpy masses in which the acid does not contact all pigment particles in addition to requiring larger quantities of salt. In general, the quantity of acid will be within the range of about 0.5 to 2 parts by weight per part of pigment. It is possible to vary the pigment-salt-acid ratio after the mass has been milled under shearing in order to improve the ease with which the mixture may be discharged from the mill. Observation of the aforestated condition, however, is necessary when the shearing action is originated in order to obtain the desired results.

The concentration of the acid will, of course, depend somewhat upon the particular acid employed and the particular pigments treated and the like. Generally speaking, however, the concentration will range from about 68 to 100 percent. Simple tests will be sufficient to indicate the specific concentration within this range which will give optimum results in any particular instance. Thus, it may be said that if the acid used is sulfuric acid and the pigment is copper phthalocyanine, best results are obtained with a concentration of acid ranging from about 79 to 82 percent. A concentration of about 94 to 98 percent sulfuric acid gives best results where the pigment is copper hexadecachloro phthalocyanine. It is therefore to be emphasized that while the results of our invention will be obtained by using a strong liquid non-oxidizing acid having a concentration within the range of about 68 to 100 percent, optimum results are obtained by varying the concentration within this range to suit the particular pigment being treated and the like.

The particular apparatus used for effecting the milling of the pigment-salt-acid mass must be one capable of exerting a substantially uniform shearing action throughout the mass. Any apparatus capable of so operating is suitable. We prefer to use a Werner-Pfleiderer type of mill, but Banbury mixers or other mills may be employed which operate by other mechanisms such as by extrusion provided that they operate to exert a uniform shearing force on the composition being milled.

The temperature at which the process is carried out is not critical and may in fact vary between the melting point and the boiling point of the composition being milled, as for example, between about 0 to 150° C. There is a definite relationship between the temperature employed and the acid concentration required to give optimum results with a particular pigment. Higher temperatures generally require lower acid concentrations. For practical reasons we prefer to operate in the temperature range of about 20 to 50° C. since unjacketed equipment may thus be employed. The milling time under shear is also dependent on other factors and may range from as little as about 5 minutes to as much as 5 hours or more, the shorter periods being preferred whenever possible for obvious reasons.

The following examples, in which parts are by weight unless otherwise indicated are illustrative of the instant invention and are not to be regarded as limitative.

*Example I*

100 parts of copper hexadecachlorophthalocyanine, 100 parts of 96 percent sulfuric acid and 200 parts of sodium sulfate were introduced into a Werner-Pfleiderer mill and milled for one hour. The magma was discharged into 1000 parts of water with agitation. The slurry which resulted was filtered and the cake washed acid-free.

The pigment thus obtained could be used without further processing for flushing into oleoresinous vehicles, or it could be dried to give a pigment powder having excellent application and transparency properties.

Similar results are obtained when sodium acid sulfate is substituted for sodium sulfate.

*Example II*

100 parts of copper phthalocyanine, 75 parts of 81 percent sulfuric acid and 200 parts of sodium sulfate were introduced into a Werner-Pfleiderer mill and milled for 2 hours. The magma was discharged into 1000 parts of water under agitation. The slurry which resulted was filtered and the cake washed acid-free.

The product obtained had excellent transparency and other pigmentary properties.

*Example III*

100 parts of metal free phthalocyanine, 50 parts of 72 percent sulfuric acid and 125 parts of sodium sulfate were introduced into a Werner-Pfleiderer mill and milled for one hour. The magma was discharged into 1000 parts of water under agitation. The slurry which resulted was filtered and the cake washed acid-free.

The product obtained had excellent transparency and other pigmentary properties.

Various modifications and variations of this invention will be obvious to a person skilled in the art and it is to be understood that such modifications and variations are to be included within the purview of this application and the spirit and scope of the appended claims.

We claim:

1. A process comprising milling with forces predominantly shearing in nature, a mixture in the form of a doughy, kneadable mass comprising a phthalocyanine pigment, from about 0.5 to 5 parts by weight per part of pigment of an acid-stable, water-soluble inorganic salt and from about 0.5 to 2 parts by weight per part of pigment of a strong, normally liquid, non-reactive acid having a concentration ranging from 68 to 100 percent, and drowning the resulting milled mixture in water.

2. The process of claim 1 in which the acid is sulfuric acid.

3. The process of claim 1 in which the salt is selected from the group consisting of alkali metal sulfates, acid sulfates, phosphates and acid phosphates.

4. The process of claim 1 in which the phthalocyanine is hexadecachloro copper phthalocyanine, the salt is sodium sulfate and the acid is sulfuric acid employed in a concentration of about 68 to 100 percent.

5. The process of claim 1 in which the phthalocyanine is copper phthalocyanine, the salt is sodium sulfate, and the acid is sulfuric acid employed in a concentration of about 68 to 100 percent.

6. The process of claim 1 in which the phthalocyanine is metal-free phthalocyanine, the salt is sodium sulfate and the acid is sulfuric acid employed in a concentration of about 68 to 100 percent.

7. The process of claim 1 in which the salt is sodium sulfate.

8. The process of claim 10 in which the salt is sodium sulfate.

9. The process of claim 8 in which the acid is sulfuric acid.

10. A process comprising milling with forces predominantly shearing in nature a mixture in the form of a doughy, kneadable mass comprising a phthalocyanine pigment, from about 0.5 to 5 parts by weight per part of pigment of an acid-stable water-soluble inorganic salt, and from about 0.5 to 2 parts by weight per part of an acid selected from the group consisting of sulfuric, chloroacetic, phosphoric, chlorosulfonic and lower alkyl sulfonic acids having a concentration ranging from 68 to 100 percent, and drowning the resulting milled mixture in water.

11. The process of claim 10 in which the salt is selected from the group consisting of alkali metal sulfates, acid sulfates, phosphates and acid phosphates.

References Cited in the file of this patent

UNITED STATES PATENTS

| | | |
|---|---|---|
| 2,278,973 | Carr | Apr. 7, 1942 |
| 2,284,685 | Detrick et al. | June 2, 1942 |
| 2,402,167 | Lang | June 18, 1946 |
| 2,765,319 | Barnhart | Oct. 2, 1956 |

FOREIGN PATENTS

| | | |
|---|---|---|
| 547,411 | Great Britain | Aug. 26, 1942 |

OTHER REFERENCES

F. I. A. T. Report No. 1313, pp. 297–303, P. B. 85172, vol. III.